United States Patent [19]

Saathoff et al.

[11] 4,355,086
[45] Oct. 19, 1982

[54] LITHIUM THIONYL CHLORIDE BATTERY

[75] Inventors: Deidrich J. Saathoff, Eagan; Hanumanthiya V. Venkatasetty, Burnsville, both of Minn.

[73] Assignee: Honeywell Inc., Minneapolis, Minn.

[21] Appl. No.: 307,480

[22] Filed: Oct. 1, 1981

[51] Int. Cl.³ .............................................. H01M 4/36
[52] U.S. Cl. .................................. 429/105; 429/196; 429/199
[58] Field of Search ............... 429/105, 196, 199, 101

[56] References Cited

U.S. PATENT DOCUMENTS 4,279,973  7/1981  Venkatasetty .................. 429/196 X
4,307,160  12/1981  Shipman et al. ................ 429/196 X Primary Examiner—Charles F. Lefevour
Attorney, Agent, or Firm—Charles G. Mersereau

[57] ABSTRACT

The discharge rate and internal conductivity of electrochemical cell including a lithium anode, and a cathode and an electrolyte including $LiAlCl_4$ and $SOCl_2$ is improved by the addition of an amount of a mixture containing $AlCl_3$ and Butyl Pyridinium Chloride.

7 Claims, 1 Drawing Figure

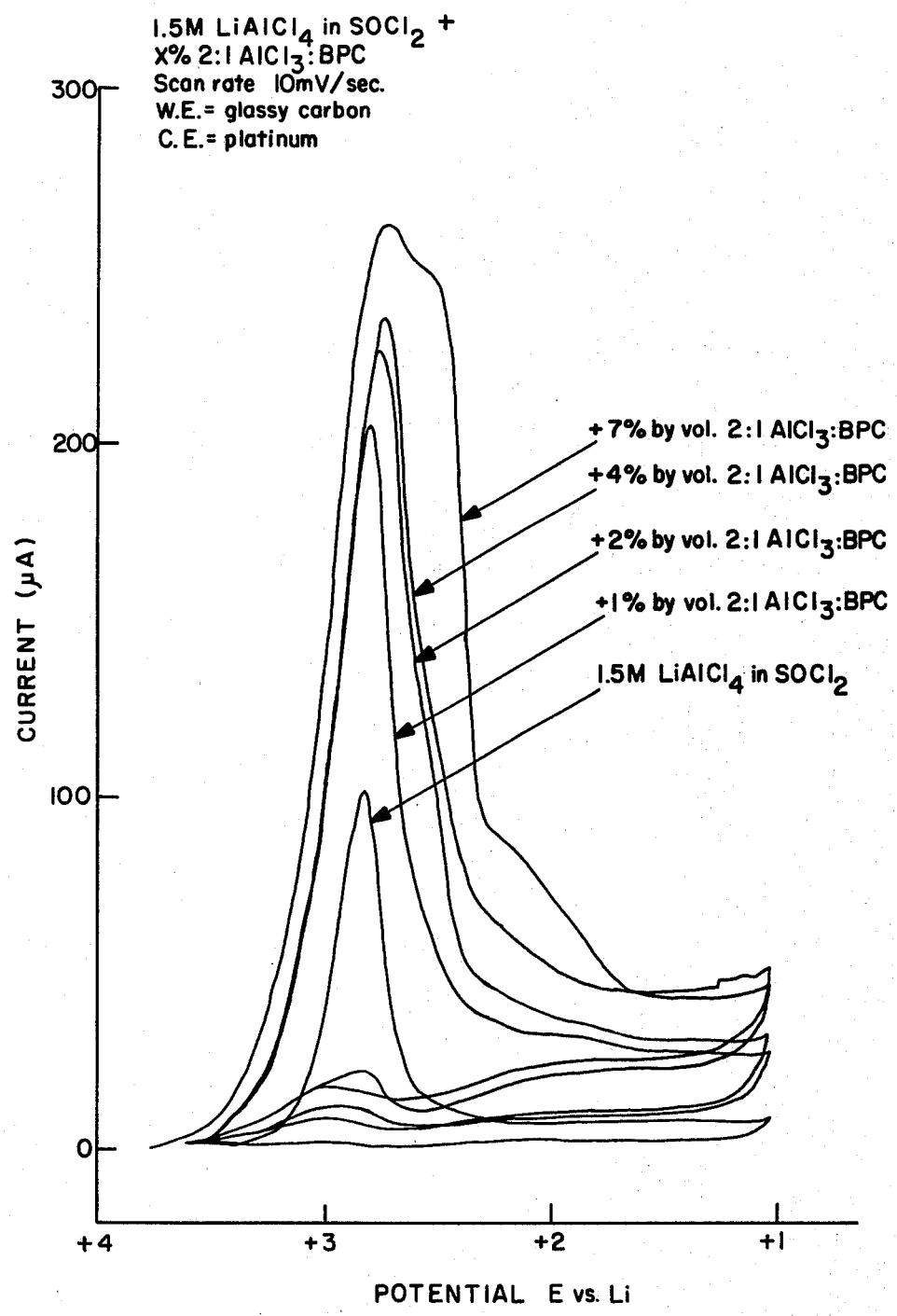

LITHIUM THIONYL CHLORIDE BATTERY

BACKGROUND OF THE INVENTION

The present invention relates generally to lithium thionyl chloride battery systems, and more particularly, to improving the discharge rate and internal conductivity of such cells by the addition of a mixture of aluminum chloride and n-butyl pyridinium chloride to the lithium aluminum chloride/thionyl chloride electrolyte.

DESCRIPTION OF THE PRIOR ART

Recent developments in the electrochemical art have required electrochemical cells with a very high rate of discharge. Because of their relatively high voltage and discharge rate, lithium-thionyl chloride batteries have been recognized for their particular suitability for many applications where such characteristics are required. The increasing energy demands from such batteries has led to the need for increasing the discharge rate of such batteries at fairly high voltage.

In addition, because of safety considerations utilizing such batteries, there also have existed a need to reduce the internal resistance of such cells in an effort to reduce electrolyte heating and thereby decrease the chance of overheating, a potential hazard associated with the use of such cells. These hazards are attributed to the generation of unstable chemical species in the solution as well as overheating of the cell leading to serious problems. Accordingly there exists a need to increase both the output rate and the solution conductivity in such cell arrangements.

SUMMARY OF THE INVENTION

According to the present invention, it has been discovered that the discharge rate of lithium thionyl chloride batteries can be substantially increased by the addition of a molten salt mixture of aluminum chloride ($AlCl_3$) and n-butyl pyridinium chloride (BPC) which is molten at room temperature to a standard lithium aluminum chloride ($LiAlCl_4$)/thionyl chloride ($SOCl_2$) electrolyte solution. It has been found that at least neutral but preferably acidic salt mixtures containing a mole ratio of between 1:1 and 2:1 of aluminum chloride to n-butyl pyridinium chloride added in an amount to produce a volume addition of from between 1% and 30% to the lithium aluminum chloride/thionyl chloride electrolyte produce cell discharge rates of 2 to 3 times the value before such addition while achieving increased cell conductivity thereby also reducing the internal cell heating in the battery.

The illustrative embodiment utilizes a system having a glassy carbon cathode and a lithium anode. The unmodified electrolyte solution comprises 1.5 M $LiAlCl_4$ in $SOCl_2$ to which from 1% by volume to 30% by volume of a molten salt mixture containing a 2:1 mole ratio of $AlCl_3$:BPC is added.

BRIEF DESCRIPTION OF THE DRAWINGS

FIG. 1 depicts plots of cell voltage (V) vs. current ($\mu a$) output of a cell without the electrolyte additive of the present invention.

DESCRIPTION OF THE PREFERRED EMBODIMENT

According to the present invention addition of an ambient temperature molten salt mixture of $AlCl_3$-n-butyl pyridinium to the $LiAlCl_4$-$SOCl_2$ electrolyte in a lithium thionyl chloride battery has been observed to greatly increase the discharge rate while reducing the internal cell resistance by about 10%.

In preparing the electrolyte solution, pure thionyl chloride was mixed with triphenyl phosphite (16% by volume) at a temperature of approximately $-10°$ C. and distilled under a positive pressure of dry nitrogen. Distillate from the first distillation was then redistilled utilizing a cutoff point of approximately 80° C. and the middle fraction of this second distillation was utilized in the electrolyte solution preparation. Anhydrous lithium aluminum chloride was prepared by mixing dry aluminum chloride to dry reagent grade lithium chloride in a mole ratio slightly favoring the lithium chloride. The mixture was infused and the molten $LiAlCl_4$ decanted in a dry box under dry and inert conditions using an atmosphere of argon. The appropriate base electrolyte was then prepared by weighing all chemicals to within 0.1 mg inside the dry box after purging the dry box with dry argon. All solutions utilized were also prepared in the dry box.

The n-butyl pyridinium chloride was prepared by refluxing n-butyl chloride with 10% excess pyridine. N-butyl pyridinium chloride cyrstalized during cooling. These crystals were then dissolved in an acetonitrile ethyl acetate mixture and recrystallized from that mixture. Anhydrous aluminum chloride ($AlCl_3$) from fluka was used without further purification. The molten solvent mixtures of $AlCl_3$-BPC were prepared by mixing amounts weighed to a 0.1 mg accuracy in cooled containers to prevent a temperature rise in the mixture.

The molten salt mixture is miscible with thionyl chloride electrolyte without producing an exothermic reaction. The data utilized in Table 1 and in FIG. 1 herein was gathered in a system utilizing a lithium reference electrode, platinum counter and a 0.075 $cm^2$ glassy carbon work electrode, using conventional cyclic voltametry scanning at the rate of 10 mv per second scan rate in a three compartment cell. The data in Table 1 and FIG. 1 was obtained beginning with an electrolyte of 1.5 M $LiAlCl_4$ in SOCl. To this, various volume percents of $AlCl_3$:BPC, were added. The $AlCl_3$:BPC utilized was in a molar ratio of 2:1 $AlCl_3$ to BPC. Whereas the 2:1 ratio was used, other ratios have also been utilized. It has been found, however, that ratios above the neutral 1:1 are generally necessary to produce any significant increases in the cell output at the desired voltage.

The cyclic voltammetric experiments were carried out in a three-compartment cell, each compartment separated by a medium poracity fritted disc. In obtaining the data a PAR 173 potentiostat/galvanostat and PAR 175 Universal Programmer and a Hewlett-Packard X-Y recorder were used.

TABLE I

| SOLUTION | CURRENT ($\mu A$) | SPECIFIC CONDUCTANCE at 23° C. |
|---|---|---|
| 1.5M $LiAlCl_4$ in $SOCl_2$ | 103 | $1.5 \times 10^{-2}$ ohm$^{-1}$ cm$^{-1}$ |
| Added Volume | | |
| + 1% $AlCl_3$:BPC | 212 | $1.56 \times 10^{-2}$ ohm$^{-1}$ cm$^{-1}$ |
| 2% $AlCl_3$:BPC | 227 | $1.61 \times 10^{-2}$ ohm$^{-1}$ cm$^{-1}$ |
| 4% $AlCl_3$:BPC | 242 | $1.64 \times 10^{-2}$ ohm$^{-1}$ cm$^{-1}$ |
| 7% $AlCl_3$:BPC | 268 | |
| 10% $AlCl_3$:PBC | | $1.67 \times 10^{-2}$ ohm$^{-1}$ cm$^{-1}$ |
| 20% $AlCl_3$:BPC | 260 | |
| 30% $AlCl_3$:BPC | 285 | |

It can readily be determined from the data of Table I and the curves of FIG. 1, even as little as 1% AlCl:BPC by volume added to the basic electrolyte solution more than doubles the current output at 2.76 V. As the volume percent AlCl:BPC is increased the current output also increases but to a lesser extent than experienced with the initial 1% addition. The specific conductivity of the solution is also seen to increase in an amount up to approximately 10%. Even this seemingly slight amount of conductivity increase does indicate that less heating will take place at the high discharge rate of the cell which certainly presents an advantage in cell operation.

Mixtures of $AlCl_3$:BPC having a ratio as above 1:1 of course are acidic and these have been found to be the most effective. Mixtures utilizing a ratio of 1:1 have also been successful, however, basic mixtures having an $AlCl_3$:BPC ratio of less than 1:1 do not appear to enhance cell performance.

The embodiments of the invention in which an exclusive property or right is claimed are defined as follows:

1. In an electrochemical cell having a lithium anode, a cathode and an electrolyte including lithium aluminum chloride and thionyl chloride, the improvement comprising the addition of a mixture of aluminum chloride and n-butyl pyridinium chloride to the electrolyte.

2. The electrochemical cell according to claim 1 wherein said mixture of aluminum chloride and n-butyl pyridinium chloride is neutral or acidic.

3. The electrochemical cell according to claim 1 wherein said electrolyte comprises a solution of between 1.0 and 2.0 M lithium aluminum chloride in thionyl chloride and said mixture of aluminum chloride and n-butyl pyridinium chloride contains a mole ratio of between 1:1 and 2:1 of aluminum chloride to n-butyl pyridinium chloride.

4. The electrochemical cell according to claim 1 wherein said cathode is carbon.

5. The electrochemical cell according to claim 2 wherein said mixture of aluminum chloride and n-butyl pyridinium chloride is added to said electrolyte in an amount between 1% and 30% volume addition.

6. The electrochemical cell according to claim 4 wherein said mixture of aluminum chloride and n-butyl pyridinium chloride is added to said electrolyte in an amount between 1% and 10% volume addition.

7. The electrochemical cell according to claims 3, 4 or 5 wherein said electrolyte comprises a 1.5 M solution of lithium aluminum chloride in the thionyl chloride and wherein said mixture of aluminum chloride and n-butyl pyridinium chloride contains a mole ratio of 2:1 of aluminum chloride to n-butyl pyridinium chloride.

* * * * *